L. P. BAYLIFF & W. HARROD,

Assignors of one-half interest to A. SMITH and A. BESSE.

Car-Coupling.

No. 9,063. Reissued Feb. 3, 1880.

WITNESSES

Villette Anderson.

Frank J. Mast.

INVENTORS

Lewis P. Bayliff

William Harrod.

by E. W. Anderson their ATTORNEY

N. PETERS, PHOTO-LITHOGRAPHER, WASHINGTON, D. C.

UNITED STATES PATENT OFFICE.

LEWIS P. BAYLIFF AND WILLIAM HARROD, OF UNION TOWNSHIP, AUGLAIZE COUNTY, OHIO, ASSIGNORS OF ONE-HALF INTEREST TO AUGUST SMITH AND ALLEN BESSE.

CAR-COUPLING.

SPECIFICATION forming part of Reissued Letters Patent No. 9,063, dated February 3, 1880.

Original No. 219,435, dated September 9, 1879. Application for Reissue filed December 15, 1879.

*To all whom it may concern:*

Be it known that we, LEWIS P. BAYLIFF and WILLIAM HARROD, of Union township, in the county of Auglaize and State of Ohio, have invented certain new and useful Improvements in Car-Couplings; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
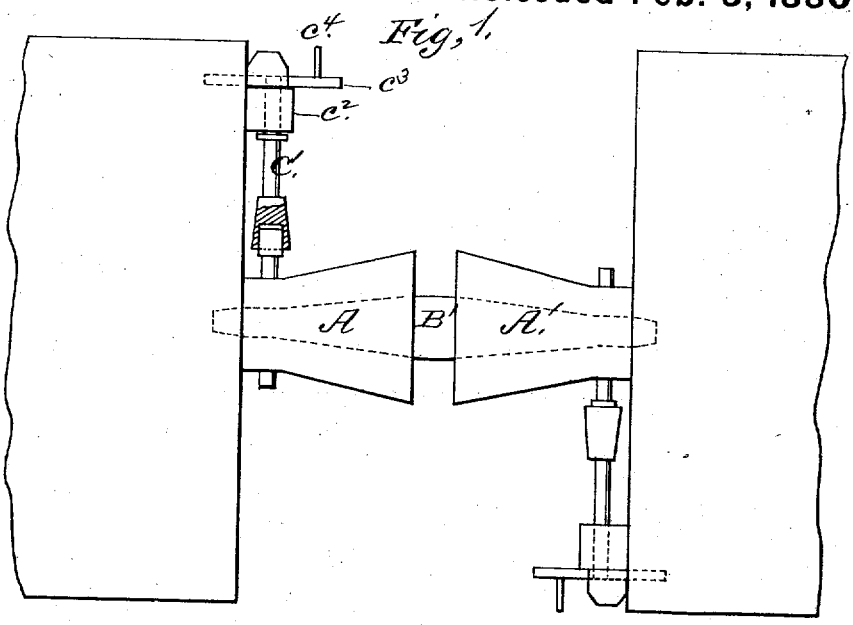
Figure 2:
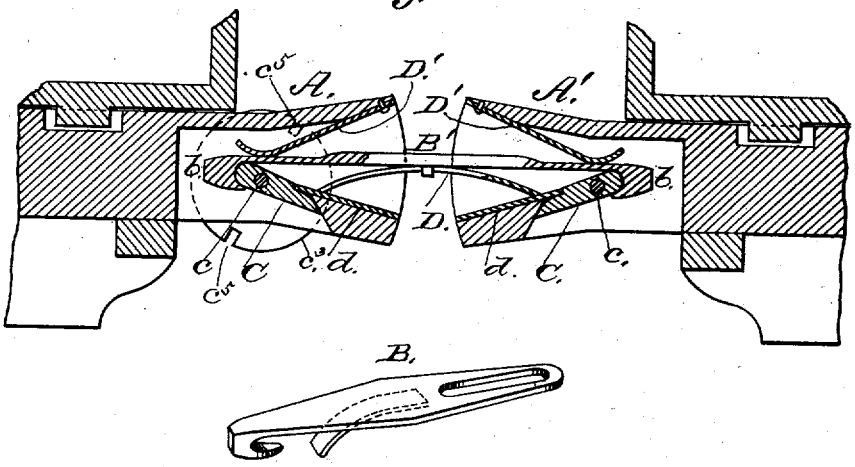

Figure 1 of the drawings is a representation of a top view of our improved coupling, and Fig. 2 is a longitudinal central section thereof.

This invention relates to improvements in car-couplings; and the nature of the invention consists in the construction and novel arrangement, in combination, of the double-ended coupling-hook, having a bowed under spring centrally arranged, upper bearing-springs extending downward from the draw-heads to the hook, lower bearings on the draw-heads for the under springs of the hook, and a transverse rock-shaft passing through the draw-head, having holding and relieving tongues or catches, all as hereinafter shown and described.

In the accompanying drawings, the letters A A′ designate the draw-heads, having their mouths flaring, and provided with springs D′, which extend downward and rearward from the upper and front portions of said mouths, said springs being curved upward at their lower ends and adapted to bear on the rear ends of the coupling hook and link, respectively.

The lower portions or sloping floors of the mouths of the draw-heads are each provided with a bearing-plate, *d*, which extends in the direction of the rock-shaft *c*, which passes transversely through each draw-head, and is provided with a catch arm or tongue, C, the heel of which is short and rounded, and the toe of which is longer and notched to engage the inner end of the bearing-plate *d*, as shown in the drawings.

B′ indicates a double-ended coupling-bar, having at each end a hook, *b*, whereby it engages with the heel of the shaft-catch.

To the middle portion of the coupling-hook is secured an under spring, D, which is bowed in form, and extends downward and forward and rearward, and bears by its ends against the bearings *d* of the draw-bars, the length of the spring being such that when one hook is engaged with the heel *b* of the shaft-catch C the hook will be held in a horizontal, or nearly horizontal, position. In this position the upper spring, D′, of the draw-head bears on the hook-bar near its end, and keeps the latter to its engagement with the heel of the shaft-catch. The double under hook-bar, B′, being provided with an under spring, D, which is bowed in form and centrally attached, the bar is reversible.

B represents a hook-link, employed when a coupling-pin is used.

The hooks of the coupling-bar, which engage with catches of the rock-shafts, are of sufficient depth to span the line of the rock-shaft, so that they bear in rear of and against said shafts, and have no tendency to pull the heels of the catches forward. Their engagement is therefore nearer the springs D′, preventing casual disengagement of their hook ends.

In order to disengage the hook-bar, the rock-shaft is turned by means of a suitable hand-wheel or other device at the side of the car, and the catch-arm of the shaft turned so as to throw its rounded heel forward, lifting the upper or bearing springs and releasing the hook from said heel.

As the spring D′ affords a stop for the long toe of the catch, it is evident that it cannot become reversed in the draw-head, and that in order to connect the hook or link bar it is only necessary to press the hook end back between said spring D′ and the catch-arm until it becomes automatically engaged with the heel of the latter.

Further devices may be provided for manipulating the rock-shaft and its catch-tongues.

The lateral extension *c′* of the shaft, reaching out to the side of the car, is supported in a pendant, $c^2$, fastened to the car. The shaft is also here provided with a disk or wheel, $c^3$, having a handle, $c^4$, and opposite marginal notches $c^5$. A spring-tooth having its spring fastened to the pendant $c^2$ or other convenient point is adapted to engage either of the notches $c^5$ of the shaft-disk $c^3$, whereby the shaft, with its catch-arms, may be set so as to prevent coupling, or may be held ready for coupling, and when coupled lock the shaft in position.

Having described our invention, what we claim as new, and desire to secure by Letters Patent, is—

The car-coupling consisting of the combination, with the draw-heads having the upper bearing-springs, D′, and the lower bearing-plates, *d*, of the double-ended hook-bar B′, having a centrally-attached bowed under spring, D, and the rock-shaft *c*, having the catch-arms C, formed with short round heels to engage the hooks of the coupling-bar, and longer toes to engage the plates *d*, substantially as specified.

In testimony that we claim the foregoing we have hereunto set our hands this 1st day of December, 1879.

LEWIS P. BAYLIFF.
WILLIAM HARROD.

Witnesses:
F. C. LAYTON,
C. T. COOK.